(12) United States Patent
Kiiskinen (10) Patent No.: US 7,748,017 B2
(45) Date of Patent: Jun. 29, 2010

(54) PROGRAM GUIDE BROWSER

(75) Inventor: Arto Kiiskinen, Espoo (FI)

(73) Assignee: Nokia Corporation, Espoo (FI)

( * ) Notice: Subject to any disclaimer, the term of this patent is extended or adjusted under 35 U.S.C. 154(b) by 403 days.

(21) Appl. No.: 11/553,864

(22) Filed: Oct. 27, 2006

(65) Prior Publication Data

US 2008/0115164 A1 May 15, 2008

(51) Int. Cl.
*H04N 5/445* (2006.01)
(52) U.S. Cl. ............... 725/46; 725/39; 725/40; 715/867
(58) Field of Classification Search ............ 725/39
See application file for complete search history.

(56) References Cited

U.S. PATENT DOCUMENTS

| | | | |
|---|---|---|---|
| 5,353,121 A | 10/1994 | Young et al. | |
| 5,589,892 A | 12/1996 | Knee et al. | |
| 6,536,041 B1 | 3/2003 | Knudson et al. | |
| 6,657,538 B1 * | 12/2003 | Ritter | 340/5.81 |
| 6,895,387 B1 * | 5/2005 | Roberts et al. | 705/14 |
| 7,076,202 B1 * | 7/2006 | Billmaier | 455/3.04 |
| 7,185,292 B2 * | 2/2007 | Pinsky et al. | 715/867 |
| 7,254,777 B2 * | 8/2007 | Hayes et al. | 715/734 |
| 2003/0163814 A1 | 8/2003 | Hayakawa | |
| 2003/0222975 A1 | 12/2003 | Klosterman | |
| 2005/0108756 A1 * | 5/2005 | Nishikawa et al. | 725/47 |
| 2005/0210510 A1 * | 9/2005 | Danker | 725/52 |
| 2005/0246732 A1 * | 11/2005 | Dudkiewicz et al. | 725/13 |
| 2005/0262533 A1 | 11/2005 | Hart et al. | |
| 2006/0236233 A1 * | 10/2006 | Ozawa et al. | 715/517 |
| 2007/0113251 A1 * | 5/2007 | Otsu | 725/56 |

FOREIGN PATENT DOCUMENTS

EP 1675392 A2 6/2006

OTHER PUBLICATIONS

European Office Action for corresponding EP Application No. 07117069.0-2202, Sep. 9, 2009, Europe.
International Search Report for EP 07 11 7069, dated Jan. 30, 2008, pp. 1-3.

* cited by examiner

*Primary Examiner*—Joseph P Hirl
*Assistant Examiner*—Joshua Taylor
(74) *Attorney, Agent, or Firm*—Ditthavong Mori & Steiner, P.C.

(57) ABSTRACT

A program guide browser (PGB) in accordance with embodiments of the invention may obtain program information items from an electronic program listing database and display the program information items on a user-interface display of a terminal, which may be a mobile terminal. The PGB may display program guide information for programs that are available for viewing on the terminal at that time. The PGB may display program information items for multiple programs one after another and may display each program information item for a predetermined duration. The sequence of program information items may repeat in a loop. An end user may specify and store personal-interest rules for the PGB to alert the user when the PGB is displaying information for a certain program, or for a certain genre of program.

47 Claims, 6 Drawing Sheets

PROGRAM GUIDE BROWSER

TECHNICAL FIELD

Embodiments of the invention relate to displaying electronic program information on terminals.

BACKGROUND

Digital broadband broadcast networks enable end users to receive digital content including video, audio, data, and so forth. Using a mobile terminal, a user may receive digital content over a wireless digital broadcast network. Digital content can be transmitted wirelessly using packetized transmission, such as provided for example by the MPEG-TS (Moving Pictures Experts Group Transport Stream) standard.

There are several broadcast services available. For example, 3GPP (Third-generation Partnership Project) provides broadcast services in Global System for Mobile Communications/Wideband CDMA (GSM/WDCMA) and 3GPP2 (Third-generation Partnership 2) provides broadcast services in CDMA2000. The work item in GSM/WCDMA is Multimedia Broadcast and Multicast Service (MBMS). The work item in CDMA2000 is Broadcast and Multicast Service (BCMCS).

In addition to MBMS of 3GPP and BCMCS of 3GPP2, Open Mobile Alliance (OMA) BCAST, a sub-working group for mobile broadcast services, provides OMA BCAST services such as content protection, service guides, program guides, or transmission scheduling for an underlying broadcast service such as MBMS, BCMCS or digital broadband broadcast systems such as DVB-H (Digital Video Broadcasting handheld).

SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the more detailed description below.

A program guide browser (PGB) in accordance with embodiments of the invention may obtain program-guide listings from an electronic program listing database and display the program-guide listings on the mobile terminal's user-interface display. The PGB may display program guide information for programs that are available for viewing on the mobile terminal at that time. The PGB may display program-guide information listings for multiple programs one after another and may display each program-guide listing for a predetermined duration. The sequence of program-guide information listings may repeat in a loop. An end user may specify and store personal-interest rules for the PGB to alert the user when the PGB is displaying information for a certain program, or for a certain genre of program.

Additional features of the invention will be apparent upon reviewing the following detailed description.

BRIEF DESCRIPTION OF THE DRAWINGS

The foregoing summary of the invention, as well as the following detailed description of preferred embodiments, is better understood when read in conjunction with the accompanying drawings, which are included by way of example, and not by way of limitation with regard to the claimed invention.

DETAILED DESCRIPTION

In the following description of the various embodiments, reference is made to the accompanying drawings, which form a part hereof, and in which is shown by way of illustration various embodiments in which the invention may be practiced. Other embodiments may be utilized and structural and functional modifications may be made without departing from the scope and spirit of the invention.

The following is separated by subheadings for the benefit of the reader. The subheadings include: introduction, illustrative operating environments, and program guide browser.

I. Introduction

When content, such as broadcast television, is brought to mobile terminals, such as mobile telephones and/or similar handheld devices, it enables people to watch television content at various times throughout the day. This may result in a viewing pattern that differs from the viewing pattern associated with traditional television. Viewing of television content on mobile terminals typically happens in one or more short bursts during the day. For example, during a work break, while doing some type of monotonous work, or while traveling. Viewing of broadcast television on a mobile-terminal is typically done when there is free time and usually lasts no more than approximately five to fifteen minutes per viewing session.

IP broadcast is a relatively efficient way, with respect to power consumption by a mobile terminal, to deliver broadcast television to a mobile terminal. This approach, therefore, saves battery power, which maximizes viewing time and battery power available for other types of mobile-terminal usage, such as making telephone calls. Using IP broadcast, however, means that a mobile terminal's television application and receiver will perform a cycle of activities during television-application startup, and that broadcast television content will typically not be available for viewing until ten to fifteen second after activating the mobile terminal's television application. Furthermore, changing channels takes approximately five seconds. Assuming there are approximately ten channels of broadcast television being offered, browsing all of the currently available broadcast television data streams (i.e., to see what's being shown on each channel) would take approximately one minute.

While one minute may be an acceptable amount of time to spend browsing through the channels for some users in some situations, users typically would rather have a quicker way to determine what broadcast-television content is currently available for viewing on a mobile terminal.

Conventional electronic program listing applications, such as electronic-program-guide (EPG), electronic service guide (ESG), and interactive program guide (IPG) applications are typically displayed on relatively large display screens, which allow display of program-guide information for several time slots and several channels simultaneously. Mobile-terminal television screens, however, are relatively small such that it is typically practicable to present program information for a single time slot and a single channel at a particular time.

As such, displaying program guide information to expedite a mobile-terminal user in determining what broadcast programs are currently available (and, optionally, what programs will soon be available) would be user-friendly.

II. Illustrative Operating Environments

Figure 1:
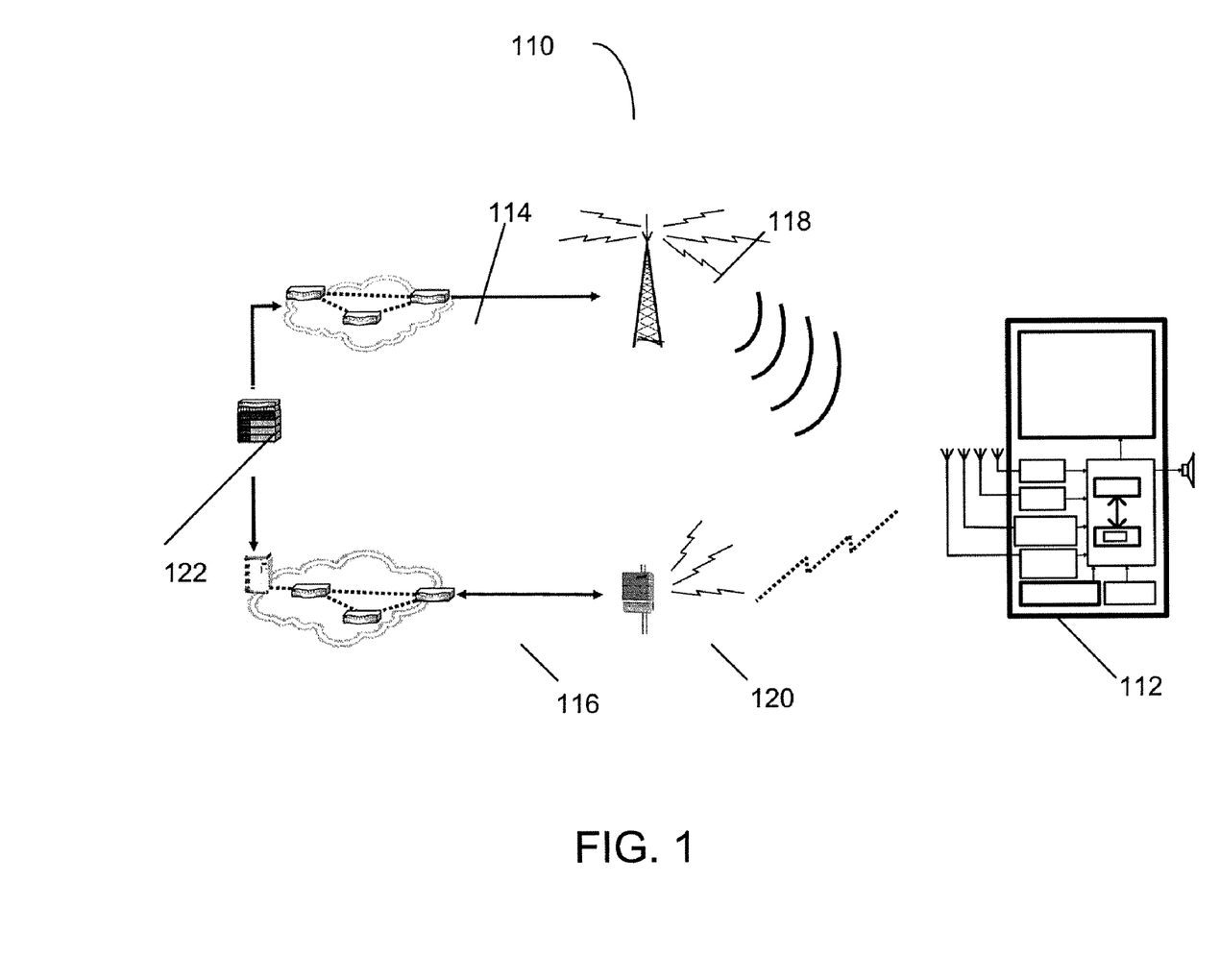
FIG. 1 illustrates a block diagram of a wireless communication system in which various aspects of the invention may be implemented.

Embodiments of the invention may be utilized across a broad array of networks and communication protocols. FIG. 1 illustrates an example of a wireless communication system 110 in which systems and methods in accordance with the invention may be employed. One or more network-enabled mobile devices 112, such as a personal digital assistant (PDA), cellular telephone, mobile terminal, personal video recorder, portable television, personal computer, digital camera, digital camcorder, portable audio device, portable radio, or combinations thereof, are in communication with a service source 122 through a broadcast network 114 and/or cellular network 116. The mobile terminal/device 112 may comprise a digital broadcast receiver device. The service source 122 may be connected to several service providers that may provide their actual program content or information or description of their services and programs to the service source that further provides the content or information to the mobile device 112. The several service providers may include, but are not limited to, one or more television and/or digital television service providers, AM/FM radio service providers, SMS/MMS push service providers, Internet content or access providers.

The broadcast network 114 may include a radio transmission of IP datacasting over DVB-H. The broadcast network 114 may broadcast a service such as a digital or analog television signal and supplemental content related to the service via transmitter 118. The broadcast network may also include a radio, television or IP datacasting broadcasting network. The broadcast network 114 may also transmit supplemental content which may include a television signal, audio and/or video streams, data streams, video files, audio files, software files, and/or video games. In the case of transmitting IP datacasting services, the service source 122 may communicate actual program content to user device 112 through the broadcast network 114 and additional information such as user right and access information for the actual program content through the cellular network 116.

The mobile device 112 may also contact the service source 122 through the cellular network 116. The cellular network 116 may comprise a wireless network and a base transceiver station transmitter 120. The cellular network may include a second/third-generation (2G/3G) cellular data communications network, a Global System for Mobile communications network (GSM), a Universal Mobile Telecommunications System (UMTS) or other wireless communication network such as a WLAN network.

In one aspect of the invention, mobile device 112 may comprise a wireless interface configured to send and/or receive digital wireless communications within cellular network 116. The information received by mobile device 112 through the cellular network 116 or broadcast network 114 may include user selection, applications, services, electronic images, audio clips, video clips, and/or WTAI (Wireless Telephony Application Interface) messages. As part of cellular network 116, one or more base stations (not shown) may support digital communications with receiver device 112 while the receiver device is located within the administrative domain of cellular network 116.

Figure 2:
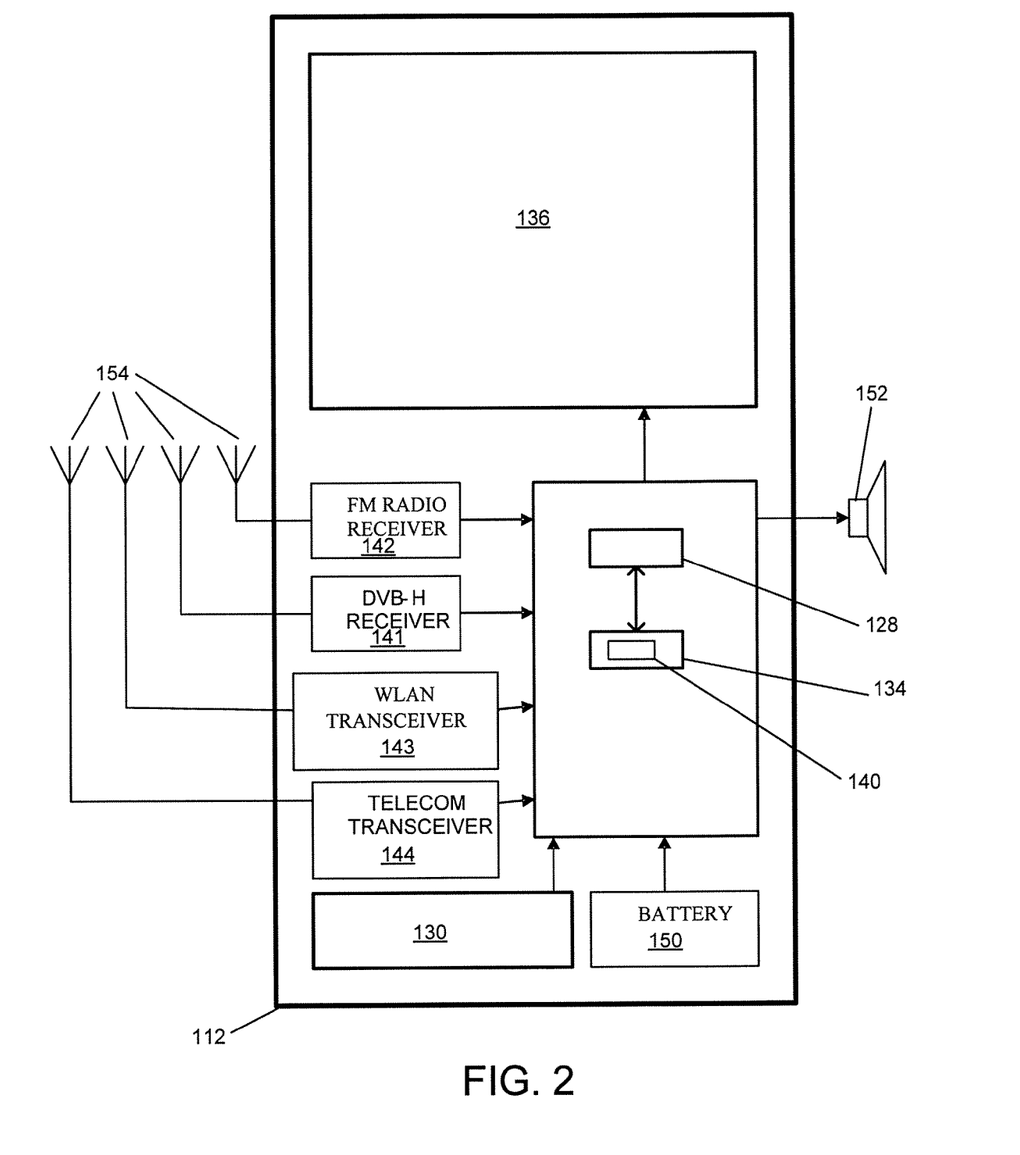
FIG. 2 illustrates a block diagram of a mobile terminal in accordance with an aspect of the invention.

As shown in FIG. 2, in accordance with one example, the invention may be employed in conjunction with mobile device 112 (also referred to as a mobile terminal), which may include processor 128 connected to user interface 130, memory 134 and/or other storage, and display 136. Mobile device 112 may also include battery 150, speaker 152 and antennas 154. User interface 130 may further include a keypad, touch screen, voice interface, four arrow keys, joy-stick, data glove, mouse, roller ball, touch screen, or the like. The mobile device 112 may be such as a mobile phone, a mobile TV, a mobile radio, a mobile communication device, a GPS receiver device, a audio/video player, a digital camera/camcorder, a laptop PC, or any combination of the aforementioned devices. Additionally, any of the aforementioned devices may be a fixed, rather than a portable, device.

Computer executable instructions and data used by processor 128 and other components within mobile device 112 may be stored in a computer readable memory 134. The memory may be implemented with any combination of read only memory modules or random access memory modules, optionally including both volatile and nonvolatile memory, wherein some of the memory modules may be detachable. Software 140 may be stored within memory 134 and/or storage to provide instructions to processor 128 for enabling mobile device 112 to perform various functions. Alternatively, some or all of mobile device 112 computer executable instructions may be embodied in hardware or firmware (not shown).

Mobile device 112 may be configured to receive, decode and process digital broadband broadcast transmissions that are based, for example, on the Digital Video Broadcast (DVB) standard, such as DVB-H or DVB-MHP, through a specific DVB receiver 141. The mobile device may also be provided with other types of receivers for digital broadband broadcast transmissions. Additionally, receiver device 112 may also be configured to receive, decode and process transmissions through FM/AM Radio receiver 142, WLAN transceiver 143, and telecommunications transceiver 144. Further the mobile device may be configured to receive transmissions based on the Digital Audio Broadcasting (DAB) standard (not shown). In one aspect of the invention, mobile device 112 may receive radio data stream (RDS) messages.

In an example of the DVB standard, one DVB 10 Mbit/s transmission may have 200 50-kbit/s audio program channels or 50 200-kbit/s video (TV) program channels. The mobile device 112 may be configured to receive, decode, and process transmission based on the Digital Video Broadcast-Handheld (DVB-H) standard or other DVB standards, such as DVB-MHP, DVB-Satellite (DVB-S), DVB-Terrestrial (DVB-T) or DVB-Cable (DVB-C). Similarly, other digital transmission formats may alternatively be used to deliver content and information of availability of supplemental services, such as ATSC (Advanced Television Systems Committee), NTSC (National Television System Committee), ISDB-T (Integrated Services Digital Broadcasting—Terrestrial), DAB (Digital Audio Broadcasting), DMB (Digital Multimedia Broadcasting), FLO (Forward Link Only) or DIRECTV. Additionally, the digital transmission may be time sliced, such as in DVB-H technology. Time-slicing may reduce the average power consumption of a mobile terminal and may enable smooth and seamless handover. Time-slicing consists of sending data in bursts using a higher instantaneous bit rate as compared to the bit rate required if the data were transmitted using a traditional streaming mechanism. In this case, the mobile device 112 may have one or more buffer memories for storing the decoded time sliced transmission before presentation.

Information regarding available services may be transmitted to a subscriber terminal or receiver within an Electronic Service Guide (ESG). Thus, an ESG may enable a terminal to communicate what services are available to end users and how the services may be accessed. ESG fragments are independently existing pieces of the ESG. Traditionally, ESG fragments comprise XML documents, but more recently they have encompassed a vast array of items, such as for example, a SDP (Session Description Protocol) description, textual file, or an image. The ESG fragments describe one or several aspects of currently available (or future) service or broadcast programs. Such aspects may include for example: free text description, schedule, geographical availability, price, purchase method, genre, and supplementary information such as preview images or clips. Audio, video and other types of data comprising the ESG fragments may be transmitted through a variety of types of networks including wireless digital broadband broadcast networks according to many different protocols. For example, data can be transmitted through a collection of networks usually referred to as the "Internet" using protocols of the Internet protocol suite, such as Internet Protocol (IP) and User Datagram Protocol (UDP). ESG fragments may also be transmitted by using ALC and FLUTE protocols. Data is often transmitted through the Internet addressed to a single user. It can, however, be addressed to a group of users, commonly known as multicasting. In the case in which the data is addressed to all users it is called broadcasting.

ESG fragments include metadata and descriptions of services or content and are instantiated using a syntax such as XML. Identifiers are used to identify the ESG fragments regarding various attributes of the ESG fragments. However, these identifiers often create large overhead due to their large size. For example, if a Uniform Resource Identifier (URI) is used as an identifier, the overhead is large and unwieldy at 255*8. Therefore, short 32-bit integer identifiers have been used to identify ESG fragments. However, identifiers must be unique for each corresponding ESG fragment. Administration of 32-bit integer identifiers would need to be globally centralized in order to provide the uniqueness of the identifier because ESG fragments from different sources may be identified by non-unique identifiers. For example, as ESG fragments are often aggregated from different sources, each source may not use a standard identifier scheme such that there may be conflicts of identifiers among different sources. In this example, different sources may use the same identifier for corresponding ESG fragments from the different sources. When the different ESG fragments from different source with the same identifier are received at the aggregator, conflicts will arise.

Figure 3:
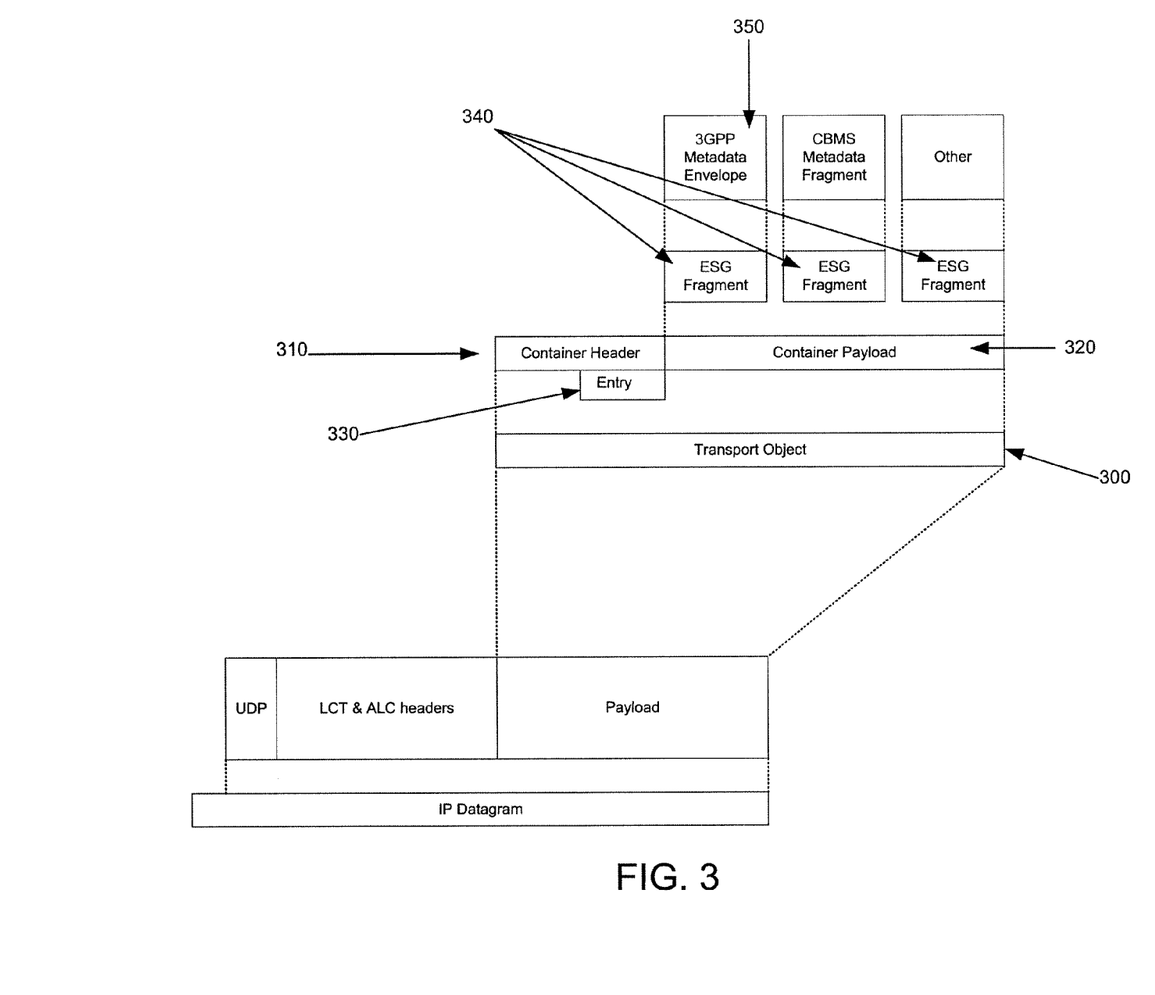
FIG. 3 illustrates a schematic diagram of an example transport object in accordance with an aspect of the invention.

FIG. 3 is a schematic diagram of an example transport object in accordance with at least one aspect of the present invention. Generally, a single transport object 300 comprises a container header 310 and a container payload 320. By incorporating the header 310 and the payload 320 into a single transport object 300, there is no longer a need to recombine each header with the information regarding where each container is located within different transported objects. Furthermore, there is no longer an issue of which to transmit first, as presented in previous systems. The container header 310 may contain configuration information regarding the header and/or the container payload 320. In one embodiment, the header 310 is coded to inform a receiver of the entry length of the header.

In an embodiment, the header 310 may have a plurality of ESG fragment descriptor entries 330 that identify the ESG fragments 340 in the container payload 320 so that the receiver may determine the exact position and/or length of each contained ESG fragment 340. For example, in one embodiment, a field specifies where the particular ESG begins within the container payload 320 by providing, for example, an offset value, start and end points, or the like. In other embodiments, metadata 350 may be associated with the individual ESG fragments 340, located within or proximate to the header 310, descriptor entries 330, an ESG fragment 340 or a mixture thereof. In one exemplary embodiment, the association of a 3GPP metadata envelope with an ESG fragment 340 may substitute, or negate the need, for additional metadata to be located in the header 310 in relation to that particular ESG fragment.

III. Program Guide Browser

Figure 4:
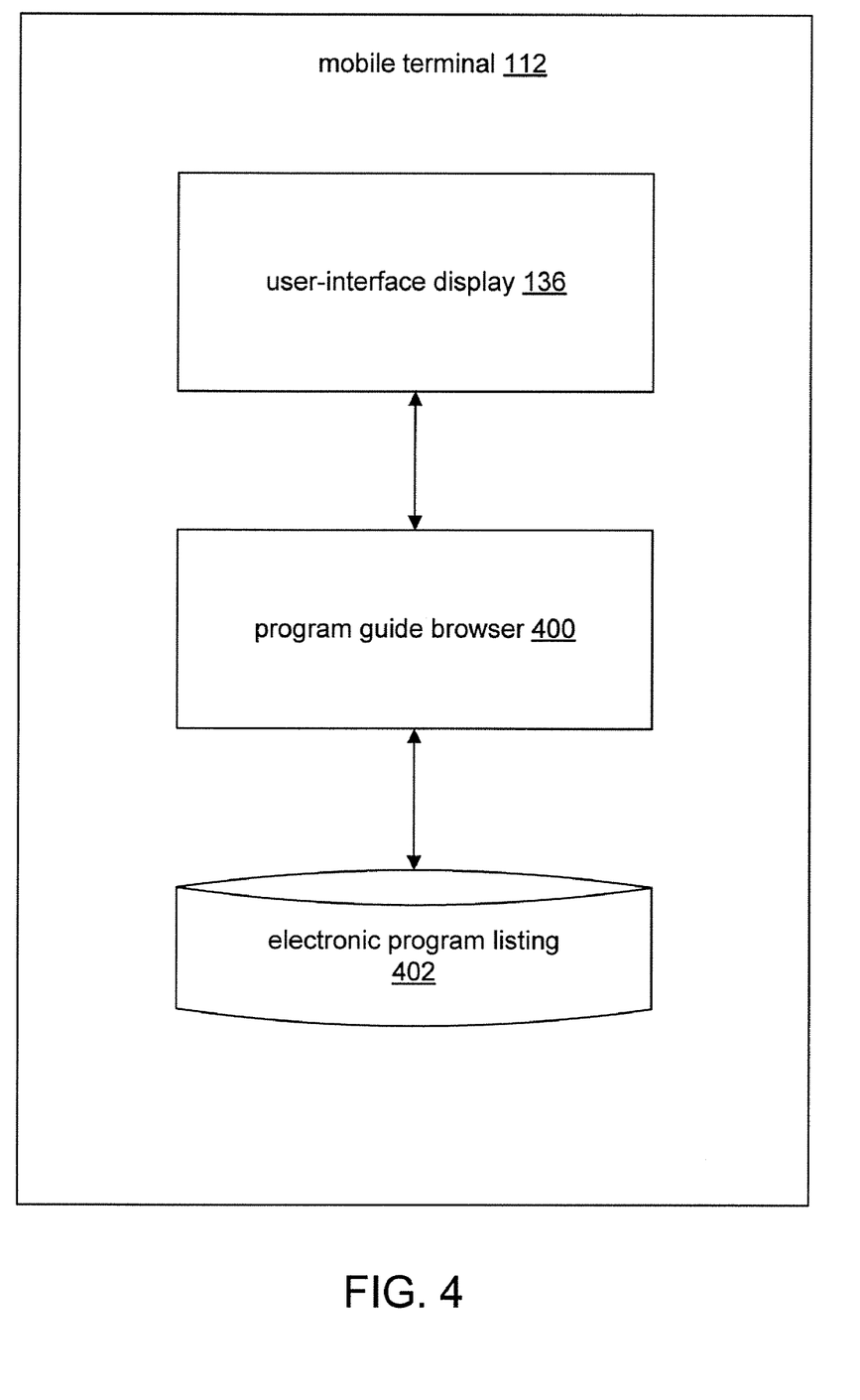
FIG. 4 shows a mobile terminal in accordance with embodiments of the invention.
Figure 5:
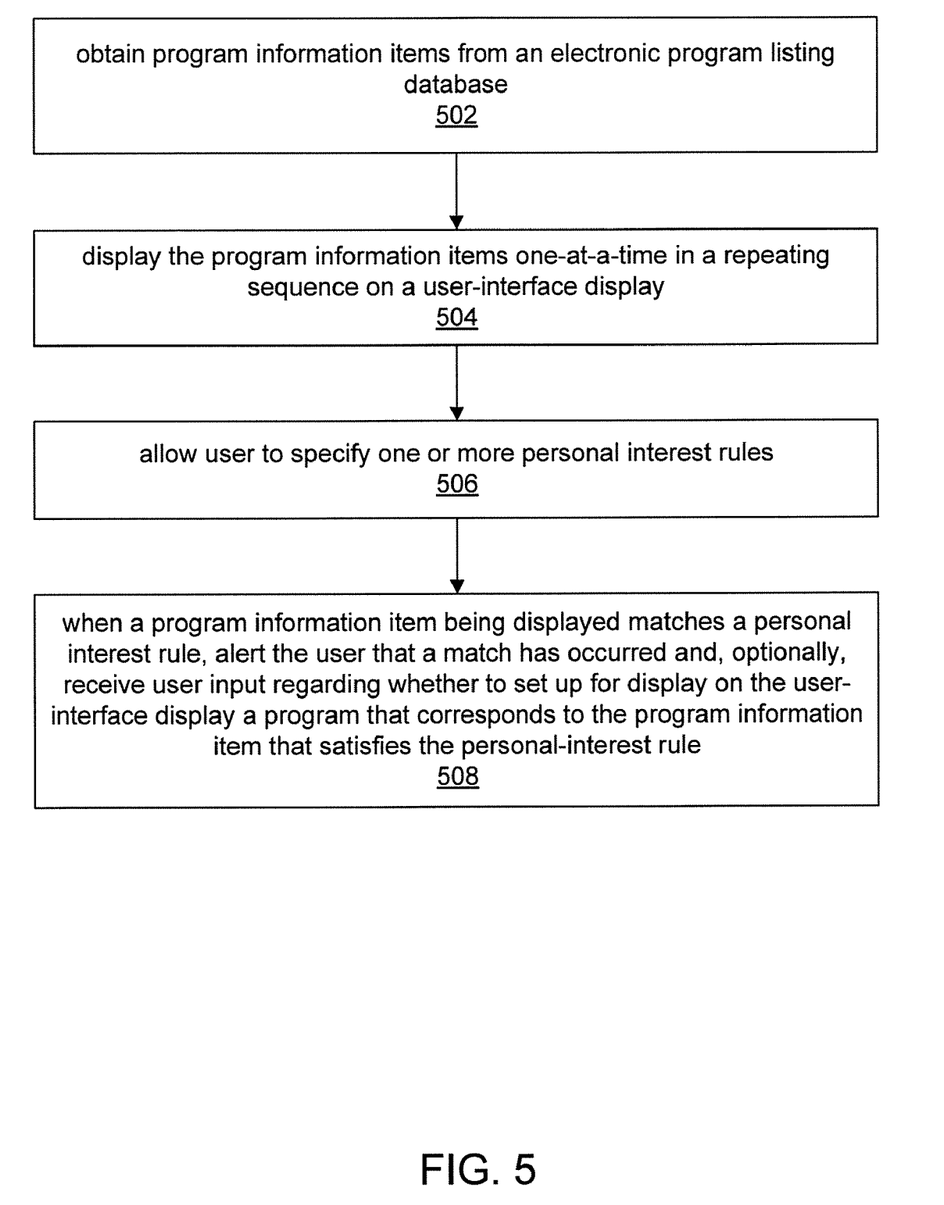
FIG. 5 shows steps performed by a program guide browser in accordance with embodiments of the invention.
Figure 6:
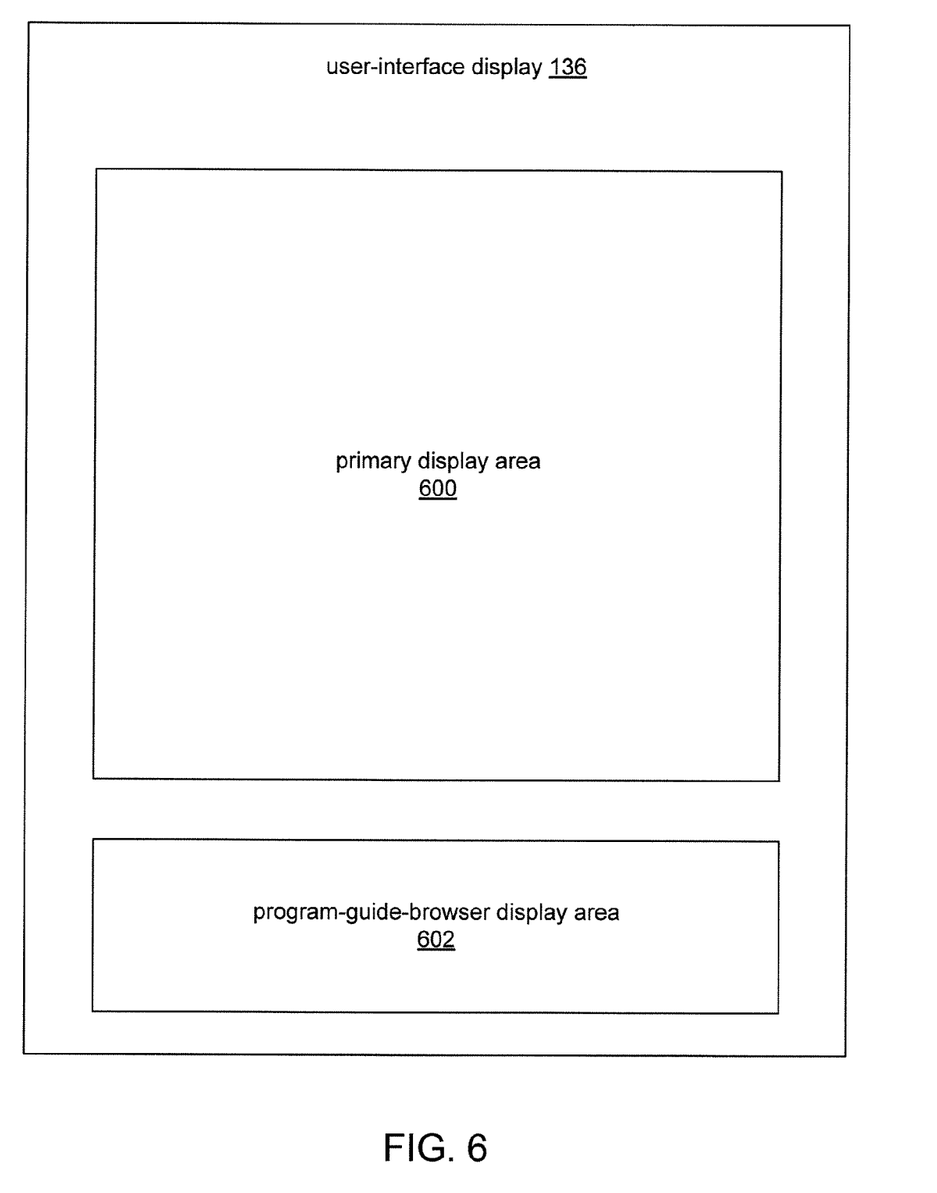
FIG. 6 is a schematic diagram of a mobile-terminal user-interface display in accordance with embodiments of the invention.

Various aspects of a program guide browser in accordance with embodiments of the invention will be discussed in connection with FIGS. 4-6. FIG. 4 shows a mobile terminal 112 in accordance with embodiments of the invention. FIG. 5 shows steps performed by a program guide browser in accordance with embodiments of the invention. FIG. 6 is a schematic diagram of a mobile-terminal user-interface display in accordance with embodiments of the invention.

The mobile terminal 112 shown in FIG. 4 contains a program guide browser 400, which, as is shown in step 502, obtains program information items from an electronic program listing database 402, which has been previously downloaded to the mobile terminal 112, and, as shown in step 504, displays the program information items on the mobile terminal's user-interface display 136.

A program guide browser (PGB) 400, in accordance with embodiments of the invention, may display program guide information for programs that are available for viewing on the mobile terminal at that time. The PGB 400 may be displayed in a program-guide-browser display area 602, which may appear on a mobile terminal's Active Idle display screen or on any other suitable display screen. The PGB 400 may display program information items for multiple programs one after another and may display each program information item for a predetermined duration. The sequence of program information items may repeat in a loop.

In accordance with an embodiment of the invention, a user may use user-interface controls, such as arrow buttons, to manually scroll through the program information items for the currently active programs. In this way, a user may be able to scroll through the program information items faster than a displayed program cycle of program information items.

An end user may specify and store personal-interest rules for the PGB to alert the user when the PGB is displaying information for a certain program, or for a certain genre of program; as shown at steps 506 and 508. For example, the personal-interest rules may specify one or more of: a keyword, a program genre, and a program name.

In accordance with embodiments of the invention, when a program satisfies a personal-interest rule, a PGB may be configured to perform one or more of the following operations: highlight the program information item for the program, which satisfies the personal-interest rule, and continue to display program information items in a loop; activate an audible notification; stop looping and automatically set up the program that satisfies the personal-interest rule; and stop looping and request feedback from the user during a certain time period, as shown at step 508.

In accordance with one embodiment of the invention, when a mobile terminal 112 is operating in an idle-screen mode and the screen is locked, the screen may be activated (i.e., unlocked) to receive user input regarding whether to set up a program when a corresponding program information item matches a personal-interest rule.

In accordance with one embodiment of the invention, a PGB 400 may include, in the group of program information items being displayed in a loop, program information items for programs that will start within a predetermined duration in the future, such as, programs that will start within the next five minutes. Of course, other suitable time periods may also be used.

In accordance with one embodiment of the invention, a PGB 400 may remove from the group of program information items being displayed in a loop, program information items for programs that are already in progress, such as programs that are more than halfway over or that are in progress for more than a predetermined amount of time, such as ten minutes. As will be apparent, other suitable percentages and/or time periods may also be used.

In accordance with one embodiment of the invention, if (1) a program is selected for viewing (either manually by a user or as the result of a personal-interest-rule match), (2) the program has an associated setup delay, and (3) the program is scheduled to start in the future, then the PGB 400 may automatically set up the program at an appropriate time before the program's scheduled start time to compensate for the setup delay time. In this way, the program will be available at its scheduled start time without the user having to wait for the setup delay to run its course. DVB-H programs are an example of a type of program that has such a set up delay.

In accordance with one embodiment of the invention, a mobile terminal may simultaneously display both a PGB 400 and a broadcast television program in a separate active television window, such as primary display area 600, on the mobile terminal's user-interface display 136. Other types of content that may be displayed in the primary display area 600 include, but are not limited to, live television broadcasts, background images, software-application icons, a Web browser, and visual radio. In accordance with embodiments of the invention, a PGB 400 may display program information items for radio programs, including, but not limited to, a visual radio service that includes a program guide.

What has been described above is merely illustrative of the application of the principles of the invention. Those skilled in the art can implement other arrangements and methods without departing from the spirit and scope of the invention. Those skilled in the art can combine embodiments of the invention in any number and combinations. Any of the methods of the invention can be implemented in software that can be stored on computer disks or other computer-readable media.

I claim:

1. A mobile apparatus comprising:
at least one processor: and
at least one memory including computer executable instructions,
the at least one memory and the computer executable instructions configured to, with the at least one processor, cause the mobile apparatus to perform at least the following,
wirelessly obtain a plurality of program guide information items corresponding to a plurality of programs from an electronic program listing database,
configure display of the plurality of the program guide information items one-at-a-time in a repeating sequence on a user-interface display of the mobile apparatus,
display the plurality of program guide information items on a locked active idle display screen mode on the user-interface display, and
unlock the locked idle display screen mode when the mobile apparatus displays a program guide information item that satisfies a personal-interest rule.

2. The mobile apparatus of claim 1, wherein the instructions are configured to cause the mobile apparatus to obtain the plurality of program guide information items while the corresponding plurality of programs are available for viewing.

3. The mobile apparatus of claim 1, wherein the instructions are configured to cause the mobile apparatus to obtain the plurality of program guide information items a predetermined duration before the corresponding plurality of programs are scheduled to be available for viewing.

4. The mobile apparatus of claim 1, wherein the instructions are configured to cause the mobile apparatus to stop obtaining the plurality of program guide information items a predetermined duration after the corresponding plurality of program guide information items were available for viewing.

5. The mobile apparatus of claim 1, wherein the instructions are configured to cause the mobile apparatus to receive input regarding whether to set up for display on the user-interface display a program that corresponds to the program guide information item that satisfies the personal-interest rule.

6. The mobile apparatus of claim 1, wherein the user-interface display is configured to display each of the plurality of program guide information items for a predetermined duration.

7. The mobile apparatus of claim 1, wherein the instructions are configured to cause the mobile apparatus to provide an alert when the user-interface display displays a program guide information item that satisfies a personal-interest rule stored in the mobile apparatus.

8. The mobile apparatus of claim 1, wherein the instructions are configured to cause the mobile apparatus to:
stop displaying the repeating sequence of program guide information items when the user-interface display displays a program guide information item that satisfies a personal-interest rule, and
set up for display on the user-interface display a program that corresponds to the program guide information item that satisfies the personal-interest rule.

9. The mobile apparatus of claim 1, wherein the user-interface display is configured to display the plurality of program guide information items one-at-a-time in a repeating sequence on the user interface display while a separate active television window is also being displayed on the user-interface display.

10. The mobile apparatus of claim 1, wherein the plurality of program guide information items are for television programs.

11. The mobile apparatus of claim 1, wherein the plurality of program guide information items are for radio programs.

12. The mobile apparatus of claim 1, wherein the user-interface display allows a user to manually scroll through, and display one-at-a-time, the plurality of program guide information items.

13. The mobile apparatus of claim 1, wherein the mobile apparatus is further caused to:

automatically set up a program selected for viewing among the plurality of the programs at a predetermined time before the selected program is scheduled to start, if the selected program is scheduled to start in a future and has an associated setup delay.

14. A method comprising:
causing, at least in part, wirelessly obtaining a plurality of program guide information items corresponding to a plurality of programs from an electronic program listing database at a mobile apparatus;
configuring display of the plurality of program guide information items one-at-a-time in a repeating sequence on a user-interface display of the mobile apparatus;
causing, at least in part, displaying the plurality of program guide information items on a locked idle screen mode on the user-interface display: and
causing, at least in part, unlocking the locked idle screen mode when displaying a program guide information item that satisfies a personal-interest rule.

15. The method of claim 14, wherein the program guide information items comprise mobile-terminal program guide information items.

16. The method of claim 14, further comprising obtaining the plurality of program guide information items while the corresponding plurality of programs are available for viewing.

17. The method of claim 14, further comprising obtaining the plurality of program guide information items a predetermined duration before the corresponding plurality of programs are scheduled to be available for viewing.

18. The method of claim 14, further comprising stopping obtaining the plurality of program guide information items a predetermined duration after the corresponding plurality of program guide information items were available for viewing.

19. The method of claim 14, further comprising: accepting user input regarding whether to set up for display on the user-interface display a program that corresponds to the program guide information item that satisfies a personal-interest rule.

20. The method of claim 14, wherein displaying the plurality of program guide information items further comprises displaying each of the plurality of program guide information items for a predetermined duration.

21. The method of claim 14, wherein displaying the plurality of program guide information items further comprises providing an alert when the user-interface display displays a program guide information item that satisfies a stored personal-interest rule.

22. The method of claim 14, wherein displaying the plurality of program guide information items further comprises:
stopping display of the repeating sequence of program guide information items when the user-interface display displays a program guide information item that satisfies a personal-interest rule; and
setting up for display on the user-interface display a program that corresponds to the program guide information item that satisfies the personal-interest rule.

23. The method of claim 14, wherein displaying the plurality of program guide information items further comprises displaying the plurality of program guide information items one-at-a-time in a repeating sequence on the user-interface display while a separate active television window is also being displayed on the user-interface display.

24. The method of claim 14, further comprising: allowing a user to manually scroll through, and display one-at-a-time, the plurality of program guide information items.

25. The method of claim 14, further comprising:
automatically setting up a program selected for viewing among the plurality of the programs at a predetermined time before the selected program is scheduled to start, if the selected program is scheduled to start in a future and has an associated setup delay.

26. A computer readable medium containing computer executable instructions that, when executed, cause a mobile apparatus to perform a method comprising:
wirelessly obtaining a plurality of program guide information items corresponding to a plurality of programs from an electronic program listing database at the mobile apparatus;
configuring display of the plurality of program guide information items one-at-a-time in a repeating sequence on a user-interface display of the mobile apparatus;
displaying the plurality of program guide information items on a locked idle screen mode on the user-interface display; and
unlocking the locked idle screen mode when displaying the program guide information item that satisfies a personal interest rule.

27. The computer readable medium of claim 26, wherein the program guide information items comprise mobile-terminal program guide information items.

28. The computer readable medium of claim 26, wherein the instructions cause the apparatus to obtain the plurality of program guide information items while the corresponding plurality of programs are available for viewing.

29. The computer readable medium of claim 26, wherein the instructions cause the apparatus to obtain the plurality of program guide information items a predetermined duration before the corresponding plurality of programs are scheduled to be available for viewing.

30. The computer readable medium of claim 26, wherein the computer executable instructions cause the apparatus to stop obtaining the plurality of program guide information items a predetermined duration after the corresponding plurality of program guide information items broadcast were available for viewing.

31. The computer readable medium of claim 26, wherein the computer executable instructions cause the apparatus to accept user input regarding whether to set up for display on the user-interface display a program that corresponds to the program guide information item that satisfies a personal-interest rule.

32. The computer readable medium of claim 26, wherein the computer executable instructions cause the apparatus to display each of the plurality of program guide information items for a predetermined duration.

33. The computer readable medium of claim 26, wherein the computer executable instructions cause the apparatus to provide an alert when the user-interface display displays a program guide information item that satisfies a personal-interest rule.

34. The computer readable medium of claim 26, wherein the computer executable instructions cause the apparatus to:
stop display of the repeating sequence of program guide information items when the user-interface display displays a program guide information item that satisfies a personal-interest rule; and
set up for display on the user-interface display a program that corresponds to the program guide information item that satisfies the personal-interest rule.

35. The computer readable medium of claim 26, wherein the computer executable instructions cause the apparatus to display the plurality of program guide information items oneat-a-time in a repeating sequence on the user-interface display while a separate active television window is also being displayed on the user-interface display.

36. The computer readable medium of claim 26, wherein the computer executable instructions cause the apparatus to allow a user to manually scroll through, and display one-at-a-time, the plurality of program guide information items.

37. The computer readable medium of claim 26, wherein the apparatus is further caused to perform:
automatically setting up a program selected for viewing among the plurality of the programs at a predetermined time before the selected program is scheduled to start, if the selected program is scheduled to start in a future and has an associated setup delay.

38. A mobile apparatus comprising:
means for wirelessly obtaining a plurality of program guide information items corresponding to a plurality of programs from an electronic program listing database at the mobile apparatus; and
means for displaying the plurality of program guide information items one-at-a-time in a repeating sequence on a user-interface display of the mobile apparatus;
means for displaying the plurality of program guide information items on a locked idle screen mode on the user-interface display; and
means for unlocking the locked idle display screen mode when the user-interface display displays a program guide information item that satisfies a personal-interest rule.

39. The mobile apparatus of claim 38, wherein the program guide information items comprise mobile-terminal program guide information items.

40. The mobile apparatus of claim 38, wherein the means for displaying the plurality of program guide information items further comprises means for obtaining the plurality of program guide information items while the corresponding plurality of programs are available for viewing.

41. The mobile apparatus of claim 38, wherein the means for displaying the plurality of program guide information items further comprises means for obtaining the plurality of program guide information items a predetermined duration before the corresponding plurality of programs are scheduled to be available for viewing.

42. The mobile apparatus of claim 38, wherein the means for displaying the plurality of program guide information items further comprises means for accepting user input regarding whether to set up for display on the user-interface display a program that corresponds to the program guide information item that satisfies a personal-interest rule.

43. The mobile apparatus of claim 38, wherein the means for displaying the plurality of program guide information items further comprises means for providing an alert when the user-interface display displays a program guide information item that satisfies a personal-interest rule.

44. The mobile apparatus of claim 38, wherein the means for displaying the plurality of program guide information items further comprises:
means for stopping display of the repeating sequence of program guide information items when the user-interface display displays a program guide information item that satisfies a personal-interest rule; and
means for setting up for display on the user-interface display a program that corresponds to the program guide information item that satisfies the personal-interest rule.

45. The mobile apparatus of claim 38, wherein the means for displaying the plurality of program guide information items further comprises means for displaying the plurality of program guide information items one-at-a-time in a repeating sequence on the user-interface display while a separate active television window is also being displayed on the user-interface display.

46. The mobile apparatus of claim 38, wherein the means for displaying the plurality of program guide information items further comprises means for allowing a user to manually scroll through, and display one-at-a-time, the plurality of program guide information items.

47. The mobile apparatus of claim 38, further comprising:
means for automatically setting up a program selected for viewing among the plurality of programs a predetermined duration before the selected program is scheduled to start, if the selected program is scheduled to start in a future and has an associated setup delay.

* * * * *